United States Patent [19]
Morley et al.

[11] 3,859,548
[45] Jan. 7, 1975

[54] PERMANENT MAGNET MOTOR

[75] Inventors: Edwin R. Morley, Two Rivers; Robert A. Heinzen, Manitowoc, both of Wis.

[73] Assignee: AMF Incorporated, White Plains, N.Y.

[22] Filed: May 18, 1973

[21] Appl. No.: 361,458

[52] U.S. Cl. .............................. 310/42, 310/164
[51] Int. Cl. ................................ H02k 15/00
[58] Field of Search .......... 310/42, 89, 164, 43, 51, 310/85, 86, 87, 88

[56] References Cited
UNITED STATES PATENTS

| | | | |
|---|---|---|---|
| 2,292,265 | 8/1942 | Carpenter | 310/164 |
| 2,511,698 | 6/1950 | Dickey | 310/164 |
| 2,572,632 | 10/1951 | Kurz | 310/164 |
| 2,589,293 | 3/1952 | Schellens | 310/42 |
| 3,014,141 | 12/1961 | Riggs | 310/164 |
| 3,032,670 | 5/1962 | Fritz | 310/164 |
| 3,330,975 | 7/1967 | Osterwalder | 310/164 |
| 3,403,273 | 9/1968 | Higuchi | 310/164 |
| 3,412,272 | 11/1968 | Kohlhagen et al. | 310/164 |
| 3,676,725 | 7/1972 | Wiser et al. | 310/89 |
| 3,737,695 | 6/1973 | Kilmer | 310/164 |

Primary Examiner—J. D. Miller
Assistant Examiner—Patrick R. Salce
Attorney, Agent, or Firm—George W. Price; John H. Gallagher

[57] ABSTRACT

A motor assembly and casing is provided in which the assembled parts are pre-aligned on a guide boss on the casing, the guide boss acting to couple the motor to a cased gear train to effect a predetermined alignment between a motor output pinion concentric with the guide boss and the input drive pinion of the gear train. The top of the casing has an internal centrally disposed index peg which interfits with the central stator core of the motor such that when the cover is secured to the casing the predetermined alignment of the motor parts with the guide boss is maintained.

16 Claims, 7 Drawing Figures

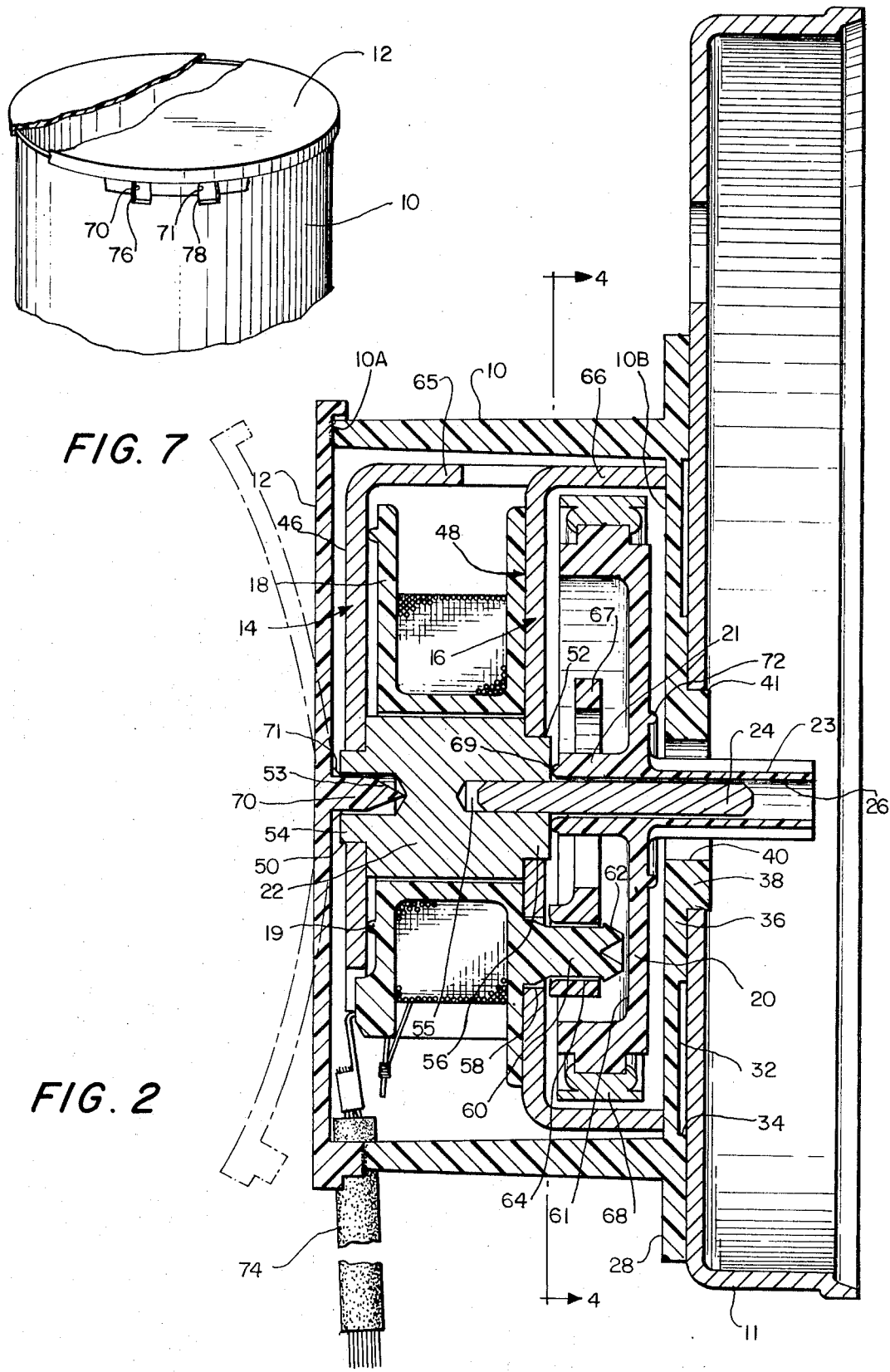

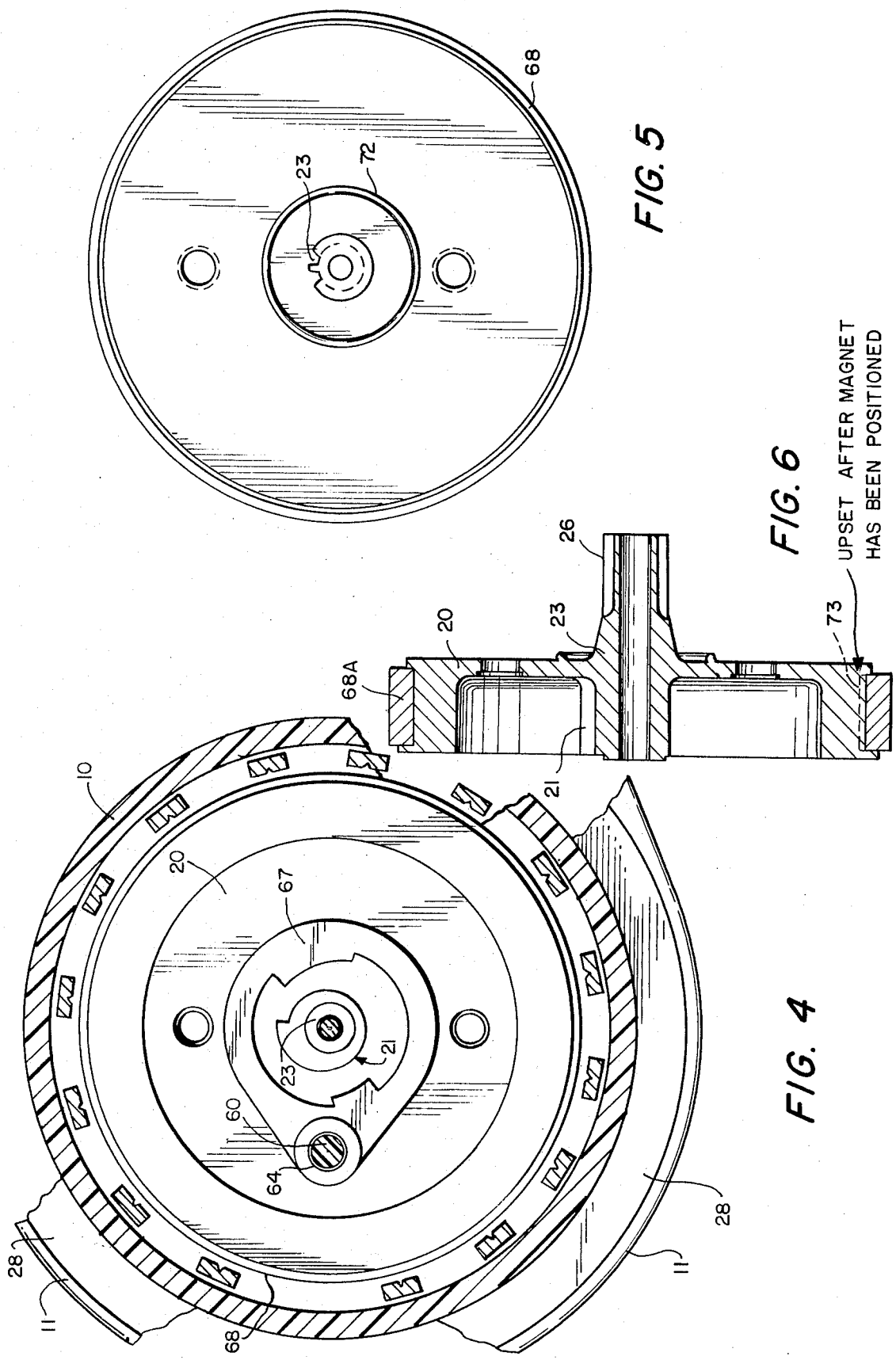

PERMANENT MAGNET MOTOR

The present invention relates generally to synchronous motors of the self-starting type for use in clocks, timers and control devices and more particularly to a novel insulated power casing for maintaining a desired set alignment of the motor parts with said casing such that a power take-off drive pinion extending from a guide boss on said casing will connect with a speed reduction gear train with the driven gear thereof aligned for cooperative optimum drive with the ouptut drive pinion of the motor when the guide boss is connected with a second casing housing said gear train.

Accordingly, an object of the present invention is to provide a novel insulated power head casing for electric motors, such as permanent magnet synchronous motors suitable for operating clock mechanisms, timers and the like arranged to be efficiently assembled with optimum alignment of the motor parts in said casing in the provision of an output driving connection readily connectable in predictable alignment with the input drive means of a cooperating drive train.

Another object is to provide a novel permanent magnet synchronous motor assembly wherein each of the associated parts of the motor stator and rotor are maintained in a preset alignment by aligning means arranged to cooperate selectively with the motor parts, the insulated housing and its mating cover.

Another object is to provide a novel system for assembly of permanent magnet motors made with lower and upper nested cup-shaped pole means and an indexed permanent magnet rotor nested in said pole pieces, all in a casing made of insulating material, said casing having a hollow output drive centering boss on its exterior bottom surface and a flexible cover, likewise of insulating material, with an internal alignment peg projecting from a convex surface of said cover into biased engagement with the one end of a central stator core concentrically supporting said pole pieces, said peg projecting into a mating socket centrally formed in said one end of said core, a rotor including a drive pinion being rotatable on a stub shaft extending centrally from a socket centered in the other end of said stator core, said pinion extending out of said casing through an aligning and centering boss, in predetermined alignment therewith, such that when the flexiblle cover in the position constrained thereon by said alignment peg is deformed and affixed to said casing, said predetermined alignment of said motor parts in said casing is secured and maintained.

Another object of the invention is to provide for simple and economic assembly of small electric motors.

Still a further object is to provide new and novel interaction between the motor casing and the cover thereof to clench and support the field coil lead wires of the motor.

Yet a further object is to provide a novel method for assembly of synchronous motors of the self-starting type, whereby an insulating casing with a centering boss and a cover for the casing with a holding and centering peg cooperate to maintain the alignment of preassembled parts of such motors when said motor parts are centered with respect to the center of said boss and then held in such centered position by securing said cover to the casing with the peg engaged in an adjacent preassembled part.

Yet another object is to provide a one-way drive device arranged to block any reverse directional drive tendency into a favorable pole position with respect to an indexed permanent magnet to attain maximum efficiency and maximum torque in starting of permanent magnet synchronous motors of the present type.

Still a further object is to provide a novel non-slip fit for an indexed annular permanent magnet ring with the rotor rim to preclude change in the permanent magnet pole index under torque and to maintain one-way cam and pole position at a set predetermined indexed position.

SUMMARY OF THE INVENTION

The present invention includes, in combination, a casing and flexible concavoconvex cover with a concentric stator centering peg extending from its convex inboard face, and casing and its cover providing an electric motor power head formed from a shell of insulation material, such as any suitable plastic.

The casing and its cover are formed with centering and alignment maintaining means, respectively, for the stator parts and the permanent magnet rotor for a synchronous motor, said motor having a central permanent magnet means mounted on the rim of a rotor disc having an integral shaft formed with a central bore, said shaft having an inboard direction control section engaged by a blocking lever on the stator and an outboard splined section in the provision of a drive pinion to be connected with the driven gear of a unitary gear case suitably connected to the base of the insulated power head casing.

The power head casing and its cover cooperate to maintain the motor stator and the rotor means in aligned coactive operative relation. The cover has a stator core engaging peg which mates in a centering socket in the base of the stator core member which connects the stator pole pieces so when pressed into position in the core socket its convex inboard side imparts thrust to the core and its aligned stator pieces and to the inboard end of the rotor shaft, to thereby maintain the motor assembly in alignment within the casing.

The casing has a guide boss on its external surface through which the drive pinion extends and on which the said pinion and rotor shaft and other motor parts are centered prior to affixing the cover to the casing. When the cover is applied to the casing, the stator core engaging peg thereon constrains the cover into a position with the casing such that when the cover is deformed into engagement with the top rim of the casing and secured thereto, the alignment of the motor parts is maintained by the peg. Ultrasonic welding of the cover to the casing is a preferred means of securing it thereto.

The guide boss is cylindrical in shape in a preferred embodiment and is insertable into a guide port in a cooperating second casing housing a reduction gear train. This gear train has its input drive pinion in predetermined alignment with the guide port, whereby, upon insertion of the guide boss into the guide port, the motor output pinion and the input drive pinion of the gear train are engaged in proper alignment. This facilitates rapid assembly of the motor and associated reduction gear as a power head for clocks, timers and the like.

The motor casing and cover also coact to provide support for the input leads to the stator coil bobbin of the motor, the cover being rotated on its stator core engaging peg until mating lead slots in the case and cover are in registry, prior to the deformation of the cover to affix same to the top rim of the motor casing.

The above and other objects and advantages of the present invention will appear more fully hereinafter from a consideration of the detailed description which follows, taken together with the accompanying drawings wherein the invention is illustrated. It is to be understood, however, that the drawings are for the purpose of illustration only and are not intended as a definition of the limits of the invention. In the drawings, wherein like reference characters refer to like parts throughout the several views:

FIG. 2 is a cross section view of the power casing showing the cover, first in broken lines, in a raised position prior to final assembly, and then in solid lines in its assembled position in which it is secured to the casing rim for housing the assembled permanent magnet motor parts;

FIG. 4 is a rear elevation view taken on section view 4—4 of FIG. 2 showing the rear countersunk face of the motor rotor to show the one-way drive member which engages with the drive lever pivotally mounted on the bobbin stud shown in FIG. 2;

FIG. 5 is an elevation view of the opposite noncountersunk side of the rotor showing a thrust bearing ring formed on its outboard side surface engageable with the bottom of the motor case and the integrally formed pinion gear on the rotor shaft extending outwardly from the motor case for engagement with the driven gear means in the gear casing;

Figure 3:
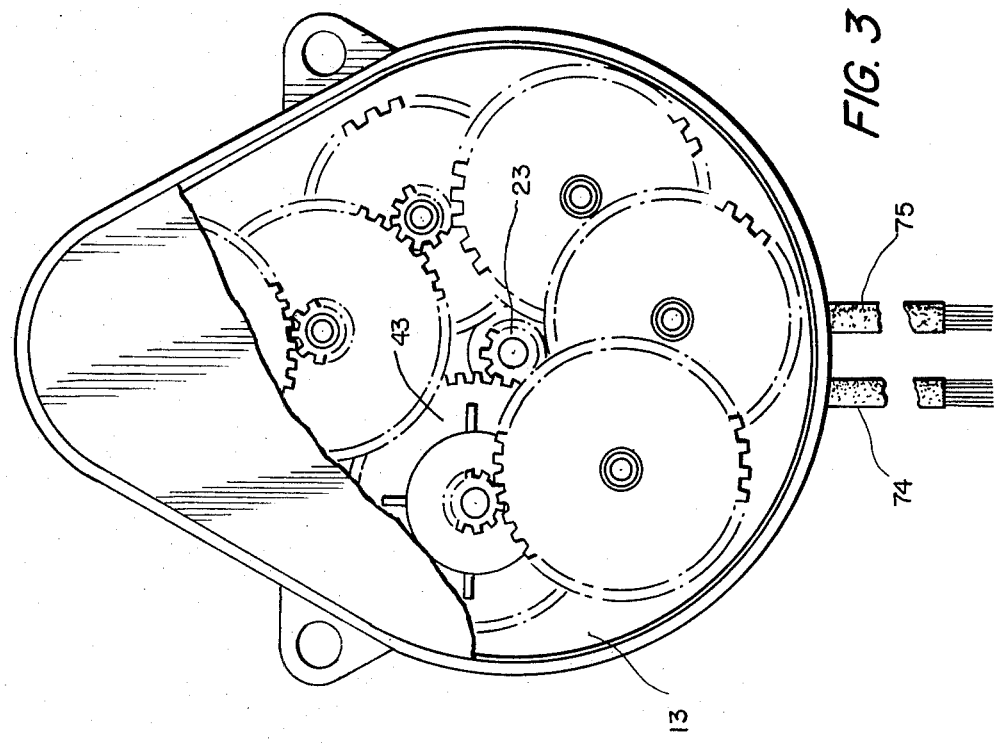
FIG. 3 is a plan view of the gear casing with the top cover plate removed to disclose the gear members therein and the end portion of the motor output pinion gear in mesh with the pick up driven gear of the gear train.
Figure 1:
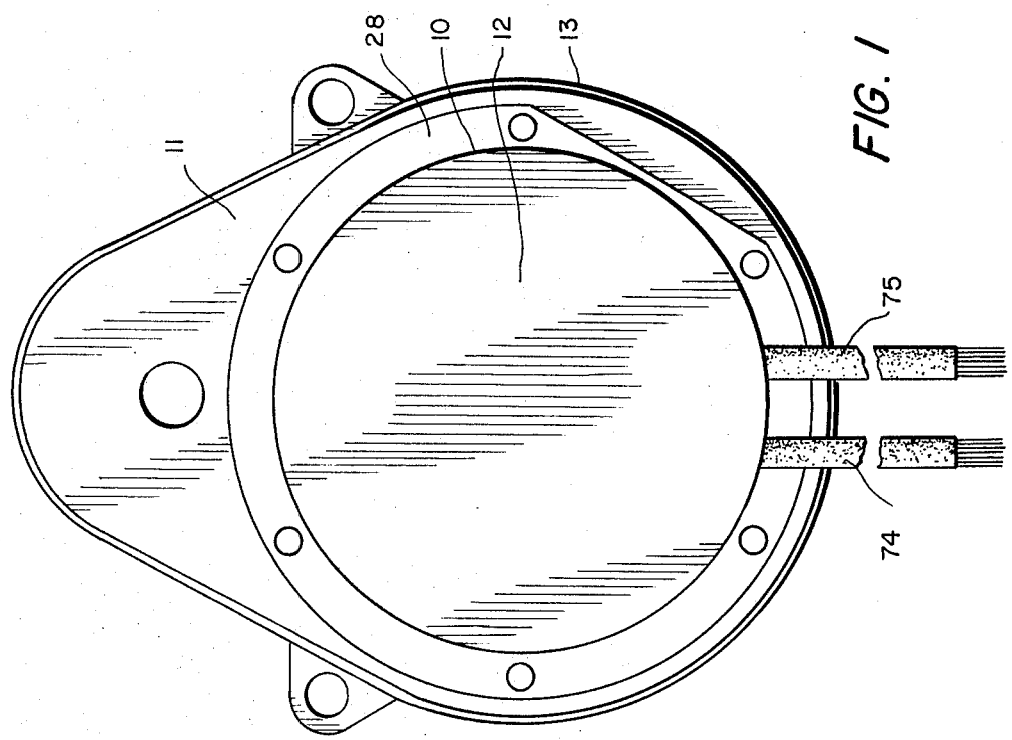
FIG. 1 is a top plan view of the assembled power casing and the gear casing connected together.

FIG. 6 is a cross-section view taken along an axial line longitudinally of the rotor shaft with the indexed permanent magnet suitably attached to the rotor rim; and FIG. 7 is a partial perspective of the flexible cover and the peripheral rim of the casing to show the mating relation to the cover and power casing to provide for clenching the coil leads to hold them in set position when the cover is secured in position. Referring to the drawings and first with particular reference to the embodiment illustrated in FIG. 2, there are shown the assembled stator and rotor parts of a permanent magnet synchronous motor in a power casing 10 with a closure cover 12 both formed of suitable electrical insulation material. This casing comprises an open top shell suitably attached at its bottom portion to the top cover plate 11 of a gear case 13.

The casing 10 includes means to provide for centering the base portions of the nested stator pole pieces 14 and 16, the stator coil bobbin 18 between the base portions of the pole pieces, the permanent magnet rotor disc 20 which is countersunk on its inboard side below its rim and flush with its rim on the outboard side, the central stator core 22 for mounting and centering the nested stator pole pieces and a stub shaft 24 extending from the outboard end of the core on which the rotor disc 20 rotates, the said stub shaft extending into the bore of the hollow rotor shaft 26.

The rotor shaft 26 is formed as an integral part of the rotor disc 20 and extends centrally from each side of the disc to provide a one-way drive 21 on the inboard side and a splined section on the outboard side comprising an output pinion gear 23.

The power casing 10 comprises a cylindrical body or shell formed with an annular flange 28 around its base portion to be suitably secured such as by pins, rivets or other suitable means to the top plate 11 of the gear case 13. The base is closed except for an opening defined by a central boss 38 projecting from its bottom surface. The exterior surface of the base may be formed with an annular countersunk portion 32 between the inboard edge 34 of the flange 28 and it is further provided with a stepped surface or land 36. Formed as a continuation of the surface 36 is the relatively thicker center hollow boss 38 with a central bore 40. This boss serves as a centering and aligning pilot means to snugly fit in an opening 41 formed in the top gear case plate 11, and when the respective base face surfaces of flange 28 and the surface 36 contiguous to the boss 38 engages with the gear case plate 11, a truly centered arrangement is attained between the pinion gear 23 and the driven gear 43 of the gear train in gear case 13.

When the power casing 10 has been loaded with the motor parts in operative relation and previously aligned with the guide boss projection 38, and said guide boss is seated snugly in the opening 41 of the gear case plate 11, the projecting pinion 23 is then in mesh with the driven take-off gear 43 of the speed reduction gear train in the gear case 13, see FIG. 3.

The assembly steps of loading the motor parts may be generally as follows: The stator pole pieces 14 and 16 with the wire coil bobbin 18 between the base portions 46 and 48 of the cup-like pole pieces are put together and the bobbin pilot lug 60 projects through the opening 58 in upper base 48 of the upper pole piece 16 into the countersunk side of the rotor disc 20.

The base portions 46 and 48 of each cup-shaped pole piece are centrally bored to provide spaced aligned openings 50 and 52 to receive mating boss projection 54 and 56 formed centrally on opposite ends of the central core 22. Each respective boss projection is centrally bored to form a receiving socket 53 and 55 at each end of the bore 22 when it is seated in the opening 50 in the base 46 of the lower stator cup 14 and in the opening 52 in the base 48 of the upper stator cup 16.

The upper stator cup 16 has an opening 58 offset from the center opening 52 in the base 48 of the upper stator pole piece. This opening 58 is penetrated by the bobbin pilot lug 60 formed integrally and projecting from the coil bobbin 18 into and in proximity to the inboard countersunk face 61 of the rotor disc 20. This pilot lug 60 on its free end is formed with a snap fastener 62 over which snaps the eyelet portion 64 of a one-way clutch part or blocking lever 67 see FIG. 4, for proper directional control when the motor is started after final assembly has been completed. Also, the inboard face of the bobbin 18 may be formed with spacer projections 19 engageable with the interior surface of the pole piece 14.

During assembly, before any connection is made with the gear case 13, the next step is to insert the bore 26 of the rotor shaft 23 over the extended portion of the stub shaft 24 carried by the outboard socket 55 in the end of core 22. This permits the rotor disc 20 to nest freely within the area defined by the alternately spaced salient pole fingers 65 and 66 of the nested pole pieces 14 and 16 and so that the one-way device or cam 21 formed on the inboard end of the rotor shaft 23 and associated latching lever 67 are engaged for one-way drive of the motor, see FIG. 4. Also, the indexed annular permanent magnet of elastomer material 68 may be suitably secured, such as by ultrasonic welding to the rim of the rotor disc 20 to preclude displacement of the permanent magnet material or the rotor rim or by merely stretching the magnet and permitting it to snap into place on a rotor such as shown in FIG. 6.

Alternatively a rigid annular magnet 68A with internal splines formed in the permanent magnet material can be used with the type of rotor shown in FIG. 6 having mating splines 73 on the rim of the rotor disc 20 and with one rim of the rotor disc 20 removed to permit assembly. Likewise when mounted on the stub shaft 24 the inboard end of the hollow rotor shaft 23 is formed so as to provide a thrust bearing surface 69 in coactive friction reducing relation to the outboard end surface of the core 22.

The core engaging peg 70 on to cover 12 has a tapered integral shim 71 thereon which mates with the flared rim of the socket 53 in the inboard end of the core 22 such that once the motor parts are assembled and pre-aligned on the guide boss 38 by any suitable jig means (not shown), the insertion of the peg 70 in the socket 53 constrains the cover 12 to assume a proper position over the rim 10A of the case 10. Then, the cover 12 is deformed about the peg 70 into engagement with the rim of the case 10 and ultrasonically welded or otherwise affixed to said rim. This deformation of the cover 12 imparts thrust to the core 22 to thereby thrust the stator poles 65 and 66 against the innersurface 10B of the motor case 10 and thereby maintain all of the assembled motor parts in the previously set alignment with the guide boss 38. Should the rotor disc 20 undergo any axial displacement on the core shaft 24, the annular thrust rings 69 and 72 on the rotor disc 20 preclude excess frictional engagement of the rotor disc 20 with the stator core 22 and case surface 10B, respectively.

When the convex cover 12 is deformed and secured in place on the case 10 the power leads 74 and 75 from the wire coil on the bobbin 18 are clenched by cut-out formations 70 and 71, see FIG. 7, at the peripheral edge of the casing 10 and cooperative spaced cut-out formations 76 and 78 are positioned to mate together on the peripheral facing edge of the cover 12. These cut-outs when positioned together by proper rotational positioning of the cover 12 on the peg 70 provide openings for the insulated coil lead wires 74 and 75 and their insulated covers in which the said lead wires 74 and 75 are securely clenched and held in set position after assembly.

Although only one system and one embodiment of insulated motor casing and gear casing have been illustrated and described in detail, it is to be expressly understood that this invention is not limited thereto, as various changes may be made in the combination and arrangement of the same, which will probably now appear to those skilled in the art. For a definition of the scope or limits of the invention, reference should be had to the appended claims.

What is claimed:

1. A synchronous motor with stator and rotor parts axially aligned in a casing formed of electrical insulation material, said casing comprising a shell with a top rim and having a bottom portion formed with pilot means, the axis of said assembled stator and rotor parts being aligned with reference to said pilot means, and a cover of electrical insulation material having a deformable resilient inner convex face for the top of the shell, said cover having a projection on the inner convex face thereof directly engageable with an adjacent stator part, said cover being deformed about said projection into engagement with said top rim and secured to said top rim of said shell such that said projection maintains said parts in centered relation with the said pilot means.

2. The invention defined in claim 1, wherein said stator parts include upstanding pole pieces engaged with the bottom portion of said casing; and wherein said defomed cover imparts axial thrust to said assembled motor parts through said projection to forcably engage said pole pieces with said bottom portion of said casing.

3. The invention defined in claim 1, wherein said motor parts include nested pole pieces having axially spaced base portions formed with aligned center openings, core means between said base portions, boss projections at each end of the said core means engaged snugly in each of said aligned center openings of the spaced base portions, a stator coil bobbin on said core between said base portions having coil leads extending therefrom, salient pole fingers axially extending in alternately spaced relation from each of said pole pieces with their ends terminating adjacent the interior of the bottom wall of the casing to define an annular area, a permanent magnet rotor within the axially extending alternately spaced pole fingers, said rotor including a hollow rotor shaft centered in said annular area, said hollow rotor shaft being mounted to rotate with said rotor on a stub shaft centrally extending from an end of said core means, a thrust bearing on an end of said rotor shaft engageable with said end of said core, a second thrust bearing formed on a surface of said rotor opposite to said first mentioned thrust bearing, said second bearing being engageable with the interior bottom wall of the casing.

4. The invention defined in claim 3, wherein said rotor comprises a disc with a permanent magnet ring secured thereon and centered around said hollow shaft.

5. The invention defined in claim 4, wherein said permanent magnet ring is formed of elastic material and stretch-fitted over said rotor disc.

6. The invention defined in claim 4, wherein said permanent magnet ring and said rotor disc further include interlocking spline means maintaining said magnet ring in predetermined indexed position on said rotor disc.

7. The invention defined in claim 3, wherein said rotor comprises a rotor disc formed with a countersunk inboard side face and an outboard side face, said countersunk side providing a chamber to receive a lug projecting from the outboard side of said bobbin and shaft means coaxial with said disc; and a direction control lever mounted on said lug engageable with said shaft means to block rotation of said rotor in one direction to provide a one-way drive to said rotor disc from an indexed start position between the salient pole fingers and the permanent magnet on said rotor disc.

8. The invention defined in claim 3, wherein said casing shell rim at the open end thereof is formed with spaced cut-outs and said cover includes an inward projecting portion with spaced cut-outs for registry with said cut-outs in the shell rim; said coil leads from said coil bobbin being clenched by the walls of the cut-outs to hold the said leads and thereby preclude stress on the lead connections to said stator coil.

9. The invention defined in claim 3, wherein said stator parts include upstanding pole pieces engaged with the bottom portion of said casing; and wherein said deformed cover imparts axial thrust to said assembled motor parts through said projection to forceably engage said pole pieces with said bottom portion of said casing.

10. The invention defined in claim 7, wherein said stator parts include upstanding pole pieces engaged with the bottom portion of said casing; and wherein said deformed cover imparts axial thrust to said assembled motor parts through said projection to forceably engage said pole pieces with said bottom portion of said casing.

11. The invention defined in claim 8, wherein said stator parts include upstanding pole pieces engaged with the bottom portion of said casing; and wherein said deformed cover imparts axial thrust to said assembled motor parts through said projection to forceably engage said pole pieces with said bottom portion of said casing.

12. A synchronous motor as described in claim 1, in combination with a gear case having a top plate, and a guide opening formed in the said top plate; said pilot means formed on the bottom portion of said housing fitting snugly in said guide opening in the top plate of the gear case to provide centered driving connection to a gear of a gear train in the gear case.

13. A synchronous motor as described in claim 2, in combination with a gear case having a top plate, and a guide opening formed in the said top plate; said pilot means formed on the bottom portion of said housing fitting snugly in said guide opening in the top plate of the gear case to provide centered driving connection to a gear of a gear train in the gear case.

14. A synchronous motor as described in claim 3, in combination with a gear case having a top plate and a guide opening formed in the said top plate; said pilot means formed on the bottom portion of said housing fitting snugly in said guide opening in the top plate of the gear case to provide centered driving connection to a gear of a gear train in the gear case.

15. A synchronous motor as described in claim 1, wherein said pilot means formed on the bottom of said housing comprises a hollow guide boss and wherein one of said rotor parts includes a shaft with a rotor pinion.

16. A synchronous motor as described in claim 15, in combination with a gear case having a top plate with a guide opening in mating relation with said hollow guide boss permitting central projection of said rotor shaft with a pinion through said guide opening and said holow guide boss into drive connection with a gear train in said gear case.

* * * * *